(12) United States Patent
Brinkman et al.

(10) Patent No.: US 8,362,925 B2
(45) Date of Patent: Jan. 29, 2013

(54) AVIONICS DISPLAY SYSTEM AND METHOD FOR GENERATING FLIGHT INFORMATION PERTAINING TO NEIGHBORING AIRCRAFT

(75) Inventors: Ron Brinkman, Phoenix, AZ (US); Pat Langdon, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 575 days.

(21) Appl. No.: 12/435,753

(22) Filed: May 5, 2009

(65) Prior Publication Data
US 2010/0283635 A1    Nov. 11, 2010

(51) Int. Cl.
*G08G 5/04* (2006.01)
(52) U.S. Cl. ............. 340/961; 340/945; 701/14; 701/4; 701/120; 701/301; 342/29; 342/455
(58) Field of Classification Search .................. 340/961, 340/971, 945, 903; 701/14, 301, 3, 4, 420, 701/300; 342/29, 455
See application file for complete search history.

(56) References Cited

U.S. PATENT DOCUMENTS

| | | | |
|---|---|---|---|
| 4,853,700 A | 8/1989 | Funatsu et al. | |
| 5,227,786 A | 7/1993 | Hancock | |
| 5,845,874 A * | 12/1998 | Beasley | 244/1 R |
| 6,021,374 A | 2/2000 | Wood | |
| 6,085,150 A | 7/2000 | Henry et al. | |
| 6,292,721 B1 | 9/2001 | Conner et al. | |
| 6,314,366 B1 | 11/2001 | Farmakis et al. | |
| 6,320,579 B1 | 11/2001 | Snyder et al. | |
| 6,433,729 B1 * | 8/2002 | Staggs | 342/29 |
| 6,484,071 B1 | 11/2002 | Conner et al. | |
| 6,690,299 B1 | 2/2004 | Suiter | |
| 6,691,004 B2 | 2/2004 | Johnson et al. | |
| 6,711,477 B1 | 3/2004 | Johnson et al. | |

(Continued)

FOREIGN PATENT DOCUMENTS

| | | |
|---|---|---|
| EP | 2196974 A1 | 6/2010 |
| EP | 2202489 A2 | 6/2010 |

(Continued)

OTHER PUBLICATIONS

Brinkman et al.; Avionics Display System and Method for Generating Three Dimensional Display Including Error-Compensated Airspace; U.S. Appl. No. 12/251,307, filed Oct. 14, 2008, pp. 1-17, US.

(Continued)

*Primary Examiner* — Jennifer Mehmood
*Assistant Examiner* — Hongmin Fan
(74) *Attorney, Agent, or Firm* — Ingrassia Fisher & Lorenz, P.C.

(57) ABSTRACT

Embodiments of a process are provided suitable for implementation by an avionics display system deployed on a host aircraft and including a monitor. In one embodiment, the process includes the step of receiving air traffic data indicative of a first flight characteristic pertaining to a neighboring aircraft. The first flight characteristic is selected from the group consisting of: (i) the wake turbulence created by the neighboring aircraft, (ii) the current flight plan of the neighboring aircraft, and (iii) the airspace in which the neighboring aircraft's current detection position should reside to ensure that the neighboring aircraft's actual position resides within the an airspace currently assigned to the neighboring aircraft. A visual representation of the first flight characteristic is generated on the monitor.

10 Claims, 8 Drawing Sheets

U.S. PATENT DOCUMENTS

| | | | |
|---|---|---|---|
| 6,798,423 B2 | 9/2004 | Wilkins, Jr. et al. | |
| 6,963,291 B2 * | 11/2005 | Holforty et al. | 340/945 |
| 6,970,104 B2 | 11/2005 | Knecht et al. | |
| 6,995,690 B1 | 2/2006 | Chen et al. | |
| 7,006,032 B2 | 2/2006 | King et al. | |
| 7,010,398 B2 | 3/2006 | Wilkins, Jr. et al. | |
| 7,030,780 B2 | 4/2006 | Shiomi et al. | |
| 7,212,917 B2 | 5/2007 | Wilson, Jr | |
| 7,218,245 B2 | 5/2007 | Wyatt et al. | |
| 7,342,515 B2 | 3/2008 | He | |
| 7,483,787 B2 | 1/2009 | Dehn | |
| 7,612,716 B2 * | 11/2009 | Smith et al. | 342/454 |
| 7,650,232 B1 * | 1/2010 | Paielli | 701/205 |
| 7,869,943 B1 | 1/2011 | Simon | |
| 2002/0075171 A1 * | 6/2002 | Kuntman et al. | 340/961 |
| 2002/0116097 A1 | 8/2002 | Block et al. | |
| 2002/0120391 A1 * | 8/2002 | Nehls, III | 701/120 |
| 2003/0036828 A1 | 2/2003 | Conner et al. | |
| 2003/0132860 A1 | 7/2003 | Feyereisen et al. | |
| 2003/0210228 A1 * | 11/2003 | Ebersole et al. | 345/157 |
| 2004/0030465 A1 | 2/2004 | Conner et al. | |
| 2004/0128070 A1 | 7/2004 | Schmidt et al. | |
| 2004/0143393 A1 | 7/2004 | Knecht et al. | |
| 2004/0160341 A1 | 8/2004 | Feyereisen et al. | |
| 2004/0189492 A1 | 9/2004 | Selk, II et al. | |
| 2005/0075763 A1 | 4/2005 | Brigode | |
| 2005/0206533 A1 | 9/2005 | Rogers et al. | |
| 2006/0069497 A1 | 3/2006 | Wilson | |
| 2006/0089760 A1 | 4/2006 | Love et al. | |
| 2006/0241820 A1 | 10/2006 | Dwyer et al. | |
| 2006/0250280 A1 | 11/2006 | Chen et al. | |
| 2006/0265109 A1 | 11/2006 | Canu-Chiesa et al. | |
| 2007/0150124 A1 | 6/2007 | Wipplinger et al. | |
| 2007/0225874 A1 | 9/2007 | Pepitone | |
| 2007/0265776 A1 | 11/2007 | Meunier et al. | |
| 2008/0174454 A1 | 7/2008 | Bitar et al. | |
| 2008/0319647 A1 | 12/2008 | Dehn | |
| 2011/0202206 A1 | 8/2011 | Karthikeyan et al. | |

FOREIGN PATENT DOCUMENTS

| | | |
|---|---|---|
| WO | 0071985 A1 | 11/2000 |

OTHER PUBLICATIONS

European Patent Office "European Search Report," mailed Aug. 26, 2010.

EP Search Report, EP 10160970.9-1236/2249126 dated Feb. 11, 2010.

USPTO Office Action, U.S. Appl. No. 12/251,307; Notification date Oct. 11, 2011.

USPTO Office Action, U.S. Appl. No. 12/251,307; Notification date May 18, 2012.

USPTO, Final Office Action issued in U.S. Appl. No. 12/251,307, dated Nov. 9, 2012.

* cited by examiner

AVIONICS DISPLAY SYSTEM AND METHOD FOR GENERATING FLIGHT INFORMATION PERTAINING TO NEIGHBORING AIRCRAFT

TECHNICAL FIELD

The present invention relates generally to vehicular display systems and, more particularly, to an avionics display system and method for visually expressing flight information pertaining to a neighboring aircraft, such as the flight path and wake turbulence created by a neighboring aircraft.

BACKGROUND

Avionics display systems deployed aboard aircraft have been extensively engineered to visually convey a considerable amount of flight information in an intuitive and readily comprehendible manner. In conventional avionics display systems, the majority of the information visually expressed on a display, such as a primary flight display, pertains to the host aircraft's flight parameters (e.g., the heading, drift, roll, and pitch of the host aircraft), nearby geographical features (e.g., mountain peaks, runways, etc.), and current weather conditions (e.g., developing storm cells). Aside from a neighboring aircraft's current detected position, conventional avionics display systems typically provide little, if any, visual information pertaining to neighboring aircraft. This may be due, in part, to current air traffic management ("ATM") practices wherein air traffic management is generally managed by personnel stationed within air traffic controllers and other ground-based control facilities. However, conventional control facility-based ATM systems are inherently limited in the volume of air traffic that they can effectively manage during a given time period. For this reason, the United States has commenced the development and implementation of a modernized ATM system (commonly referred to as the "Next Generation Air Transportation System" or, more simply, "NextGen") in which air traffic management will be largely handled by individual flight crews utilizing data compiled from a constellation of computerized systems onboard satellites and neighboring aircraft. Europe has also begun the development and implementation of a similar program commonly referred to as the "Single European Sky ATM Research," or "SESAR," program.

In view of the above described trend toward aircrew-centric traffic management, it is desirable to provide an avionics display system and method for visually expressing one or more flight characteristics pertaining to neighboring aircraft. In accordance with embodiments of the present invention, these flight characteristics may include the wake turbulence created by a neighboring aircraft, the current flight plan of the neighboring aircraft, and the neighboring aircraft's error-compensated airspace; i.e., the airspace in which the neighboring aircraft's detected position should reside to ensure that the neighboring aircraft's actual position remains within the neighboring aircraft's currently-assigned airspace. It would also be desirable if, in certain embodiments, the avionics display system and method were capable of displaying such flight characteristics when the neighboring aircraft is in a non-flight phase, such as during taxi. It would be feasible that the neighboring aircraft could be in-flight or on the ground. Other desirable features and characteristics of the present invention will become apparent from the subsequent detailed description of the invention and the appended claims, taken in conjunction with the accompanying drawings and this background of the invention.

BRIEF SUMMARY

Embodiments of a process are provided suitable for implementation by an avionics display system deployed on a host aircraft and including a monitor. In one embodiment, the process includes the step of receiving air traffic data indicative of a first flight characteristic pertaining to a neighboring aircraft. The first flight characteristic is selected from the group consisting of: (i) the wake turbulence created by the neighboring aircraft, (ii) the current flight plan of the neighboring aircraft, and (iii) the airspace in which the neighboring aircraft's current detection position should reside to ensure that the neighboring aircraft's actual position resides within the an airspace currently assigned to the neighboring aircraft. A visual representation of the first flight characteristic is generated on the monitor.

Embodiments of an avionics display system are further provided for deployment onboard an aircraft including an air traffic data source. The air traffic data source provides the avionics display system with data indicative of at least one flight characteristic pertaining to a neighboring aircraft. In one embodiment, the avionics display system includes a monitor and a processor operatively coupled to the monitor. The processor is configured to receive air traffic data from the air traffic data source indicative of a first flight characteristic pertaining to a neighboring aircraft, and to generate on the monitor a three dimensional visual representation of the first flight characteristic. The first flight characteristic is selected from the group consisting of: (i) the wake turbulence created by the neighboring aircraft, (ii) the neighboring aircraft's flight plan, and (iii) the airspace in which the neighboring aircraft's current detection position should reside to ensure that the neighboring aircraft's actual position resides within the neighboring aircraft's currently assigned airspace.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
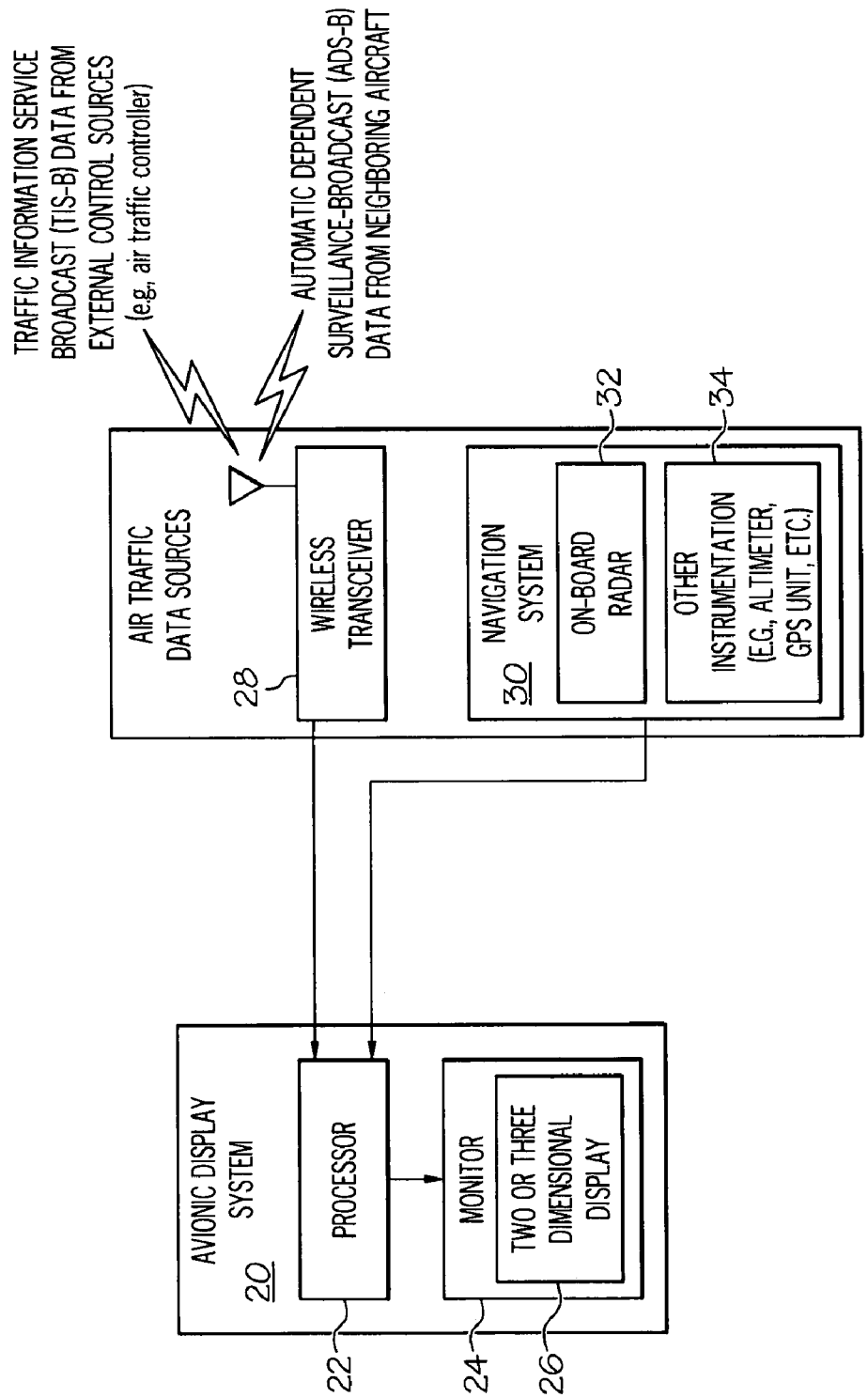
FIG. 1 is functional block diagram of a generalized avionics display system in accordance with an exemplary embodiment.

FIG. 1 is a functional block diagram of a generalized avionics display system 20 in accordance with an exemplary embodiment. Avionics display system 20 includes at least one processor 22 and at least one monitor 24, which is operatively coupled to processor 22. During operation of avionics display system 20, processor 22 drives monitor 24 to produce a graphical display 26 that visually provides a pilot and crew with navigational informational pertaining to the host aircraft and to neighboring aircraft within a predetermined vicinity of the host aircraft. Graphical display 26 may include visual representations of one or more of flight characteristics pertaining to a neighboring aircraft, as described more fully below. Processor 22 may generate display 26 in a two dimensional format (e.g., as a moving map display), in a three dimensional format (e.g., as a perspective display), or in a hybrid format (e.g., in a picture-in-picture or split screen arrangement).

Processor 22 may comprise, or be associated with, any suitable number of individual microprocessors, flight control computers, navigational equipment, memories, power supplies, storage devices, interface cards, and other standard components known in the art. In this respect, the processor 22 may include or cooperate with any number of software programs (e.g., avionics display programs) or instructions designed to carry out the various methods, process tasks, calculations, and control/display functions described below. In a preferred embodiment, processor 22 is included within a Flight Management Computer of the type commonly deployed within a Flight Management System (FMS).

Image-generating devices suitable for use as monitor 24 include various analog (e.g., cathode ray tube) and digital (e.g., liquid crystal, active matrix, plasma, etc.) display devices. In certain embodiments, monitor 24 may assume the form of a Head-Down Display (HDD) or a Head-Up Display (HUD) included within an aircraft's Electronic Flight Instrument System (EFIS). Monitor 24 may be disposed at various locations throughout the cockpit. For example, monitor 24 may comprise a primary flight display (PFD) and reside at a central location within the pilot's primary field-of-view. Alternatively, monitor 24 may comprise a secondary flight deck display, such as an Engine Instrument and Crew Advisory System (EICAS) display, mounted at a location for convenient observation by the aircraft crew but that generally resides outside of the pilot's primary field-of-view. In still further embodiments, monitor 24 may be worn by one or more members of the flight crew.

Processor 22 includes one or more inputs operatively coupled to one or more air traffic data sources. During operation of display system 20, the air traffic data sources continually provide processor 22 with navigational data pertaining to neighboring aircraft. In the exemplary embodiment illustrated in FIG. 1, the air traffic data sources include a wireless transceiver 28 and a navigation system 30, which are operatively coupled to first and second inputs of processor 22, respectively. Navigation system 30 includes an onboard radar 32 and various other onboard instrumentation 34, such as a radio altimeter, a barometric altimeter, a global positioning system (GPS) unit, and the like. In a preferred embodiment, navigation system 30 may be included within a FMS; and onboard radar 32 may be included within a Terrain Awareness and Warning System (TAWS), such as an Enhanced Ground Proximity Warning System (EGPWS).

With continued reference to FIG. 1, wireless transceiver 28 is considered an air traffic data source in that transceiver 28 receives navigational data from external control sources and relays this data to processor 22. For example, wireless transceiver 28 may receive Traffic Information Services-Broadcast (TIS-B) data from external control sources, such as satellite and various ground-based facilities including Air Traffic Control Centers, Terminal Radar Approach Control Facilities, Flight Service Stations, control towers, and the like. In addition, wireless transceiver 28 may periodically receive Automatic Dependent Surveillance-Broadcast (ADS-B) data from neighboring aircraft. TIS-B data, ADS-B data, and other such external source data is preferably formatted to include air traffic state vector information, which may be utilized to determine a neighboring aircraft's current position. Furthermore, in accordance with embodiments of the present invention, the TIS-B data and/or the ADS-B may also be formatted to include additional information useful in determining other flight characteristics of the neighboring aircraft including the wake turbulence created by the neighboring aircraft, the neighboring aircraft's current flight plan, and the neighboring aircraft's error-compensated airspace as described more fully below in conjunction with FIGS. 2-7.

Figure 2:
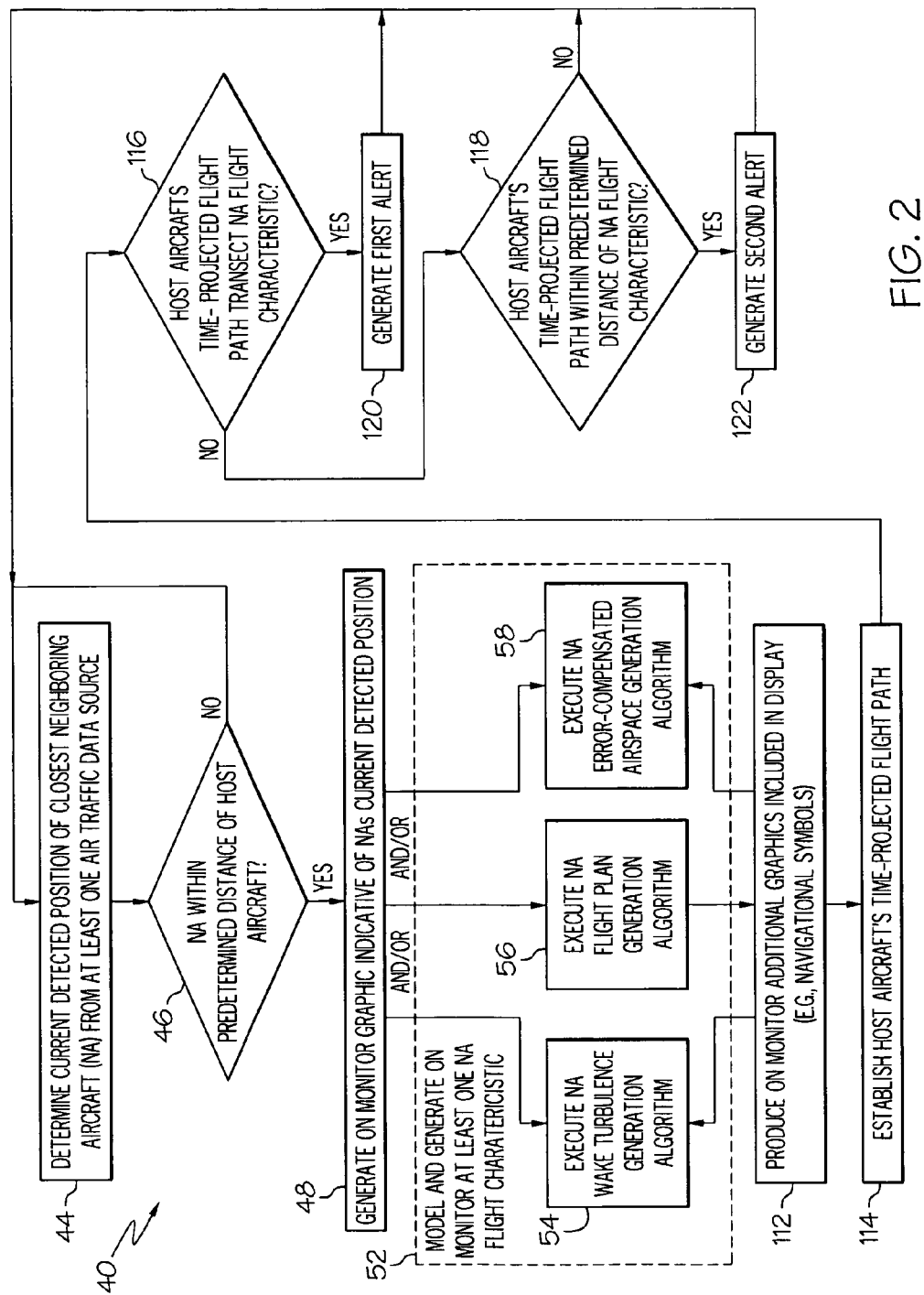
FIG. 2 is a flowchart illustrating an exemplary process that may be performed by the avionics display system shown in FIG. 1.
Figure 3:
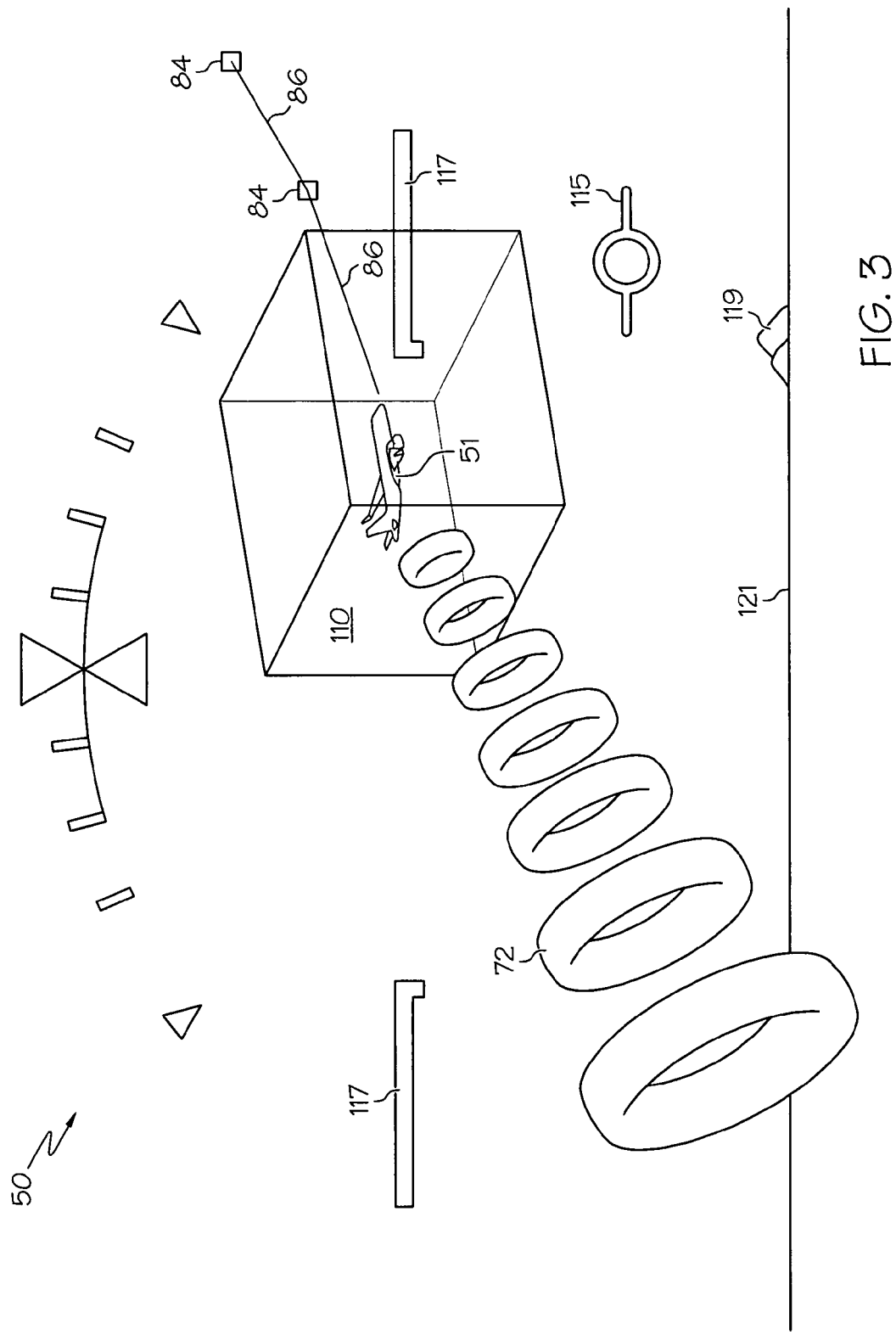
FIG. 3 is a snapshot of a three dimensional perspective display that may be generated on the monitor included in the avionics display system shown in FIG. 1 via the performance of the exemplary process illustrated in FIG. 2.

FIG. 2 is a flowchart illustrating an exemplary main process 40 that may be carried out by processor 22 to generate a three dimensional display on monitor 24 including a visual representation of one or more flight characteristics pertaining to a neighboring aircraft, and FIG. 3 is a snapshot of an exemplary three dimensional perspective display 50 that may be generated pursuant to main process 40. To commence main process 40 (STEP 44, FIG. 2), processor 22 first determines the position of the closest neighboring aircraft utilizing data provided by at least one of the air traffic data sources, such as signals provided from onboard radar 32, TIS-B data provided from one or more external control sources and received via wireless transceiver 28, and/or ADS-B data provided from the neighboring aircraft and also received via wireless transceiver 28. If the data received during STEP 44 indicates that a neighboring aircraft is not within a predetermined distance of the host aircraft (STEP 46 FIG. 2), processor 22 returns to STEP 44 and the process repeats. If, instead, the data indicates that a neighboring aircraft is within a predetermined distance of the host aircraft, processor 22 generates a graphic indicative of the neighboring aircraft's current detected position on monitor 24 (STEP 48). For example, and with reference to FIG. 3, processor 22 may generate a three dimensional rendered model 51 representing the neighboring aircraft's current detected position.

After generating a graphic indicative of the neighboring aircraft's current detected position (STEP 48, FIG. 2), processor 22 advances to STEP 52 wherein processor 22 models and generates a visual representation of at least one flight characteristic pertaining to the neighboring aircraft. To this end, processor 22 may execute one or more of the following algorithms during STEP 52: (i) a neighboring aircraft wake turbulence algorithm 54; (ii) a neighboring aircraft flight plan algorithm to 56; and (iii) a neighboring aircraft error-compensated airspace algorithm 58. As described below in conjunction with FIG. 4, neighboring aircraft wake turbulence algorithm 54 is utilized to model and generate a visual representation of the wake turbulence created by the neighboring aircraft; as described below in conjunction with FIG. 5, neighboring aircraft flight plan algorithm 56 is utilized to model and generate a visual representation of the immediate leg of the neighboring aircraft's current flight plan; and, as described below in conjunction with FIG. 6, neighboring aircraft error-compensated algorithm 58 is utilized to model and generate a visual representation of the neighboring aircraft's error-compensated airspace (i.e., the airspace in which the neighboring aircraft's current detection position should reside to ensure that the neighboring aircraft's actual position remains within the neighboring aircraft's currently assigned airspace).

Figure 4:
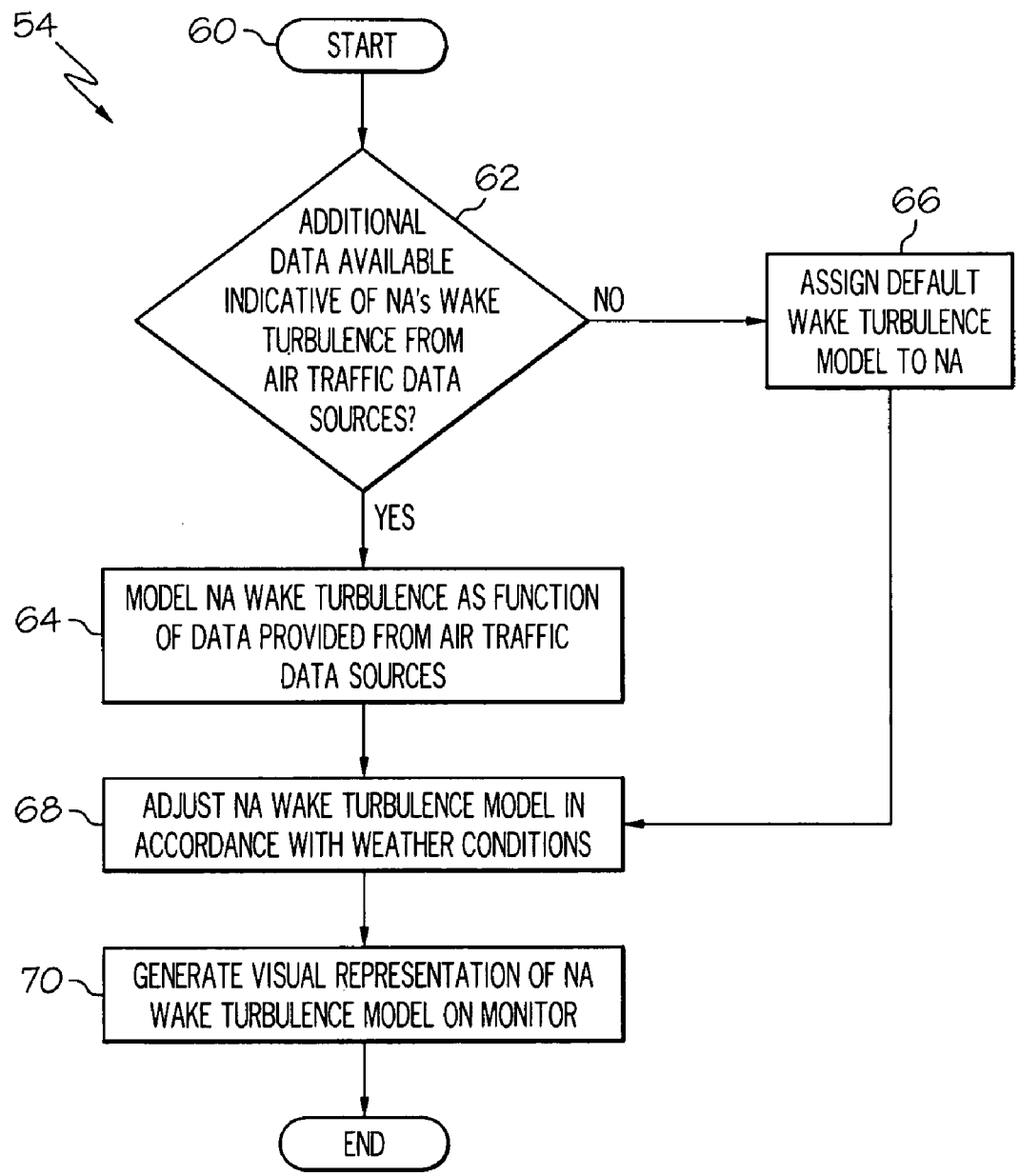
FIGS. 4, 5, and 6 are flowcharts illustrating first, second, and third exemplary algorithms, respectively, that may be performed during the exemplary process illustrated in FIG. 2 to generate visual representations of one or more flight characteristics pertaining to a neighboring aircraft.

FIG. 4 illustrates, in greater detail, exemplary algorithm 54 that may be performed during STEP 52 of main process 40 (FIG. 2) to generate a visual representation of the wake turbulence created by the neighboring aircraft on monitor 24 (FIG. 1). After initializing algorithm 54 (STEP 60, FIG. 4), processor 22 determines if additional data indicative of the wake turbulence created by the neighboring aircraft is available from the air traffic data sources (STEP 62, FIG. 4). Wake turbulence data may include any data parameters useful in modeling the wake turbulence created by the neighboring aircraft; e.g., data indicative of the location, spread, ferocity, or other characteristics of the wake turbulence created by the neighboring aircraft. For example, the wake turbulence data received during STEP 62 may describe various physical characteristics of the neighboring aircraft, such as the neighboring aircraft's engine type (e.g., propeller or jet engine) and/or the neighboring aircraft's wing type (e.g., whether fixed wing or rotary wing, whether winglets are present, wing shape, wingspan, etc.). The wake turbulence data received during STEP 62 may also describe the current flight characteristics of the neighboring aircraft, such as the neighboring aircraft's current heading, speed, acceleration, and/or location. Notably, in certain embodiments, onboard radar 32 may be utilized to approximate a neighboring aircraft's size, heading, and/or speed even when external source data (e.g., ADS-B data provided from the neighboring aircraft or TIS-B data provided from an external control source) is currently unavailable. After receiving wake turbulence data during STEP 62, processor 22 utilizes the wake turbulence data to construct a virtual model of the wake turbulence created by the neighboring aircraft (STEP 64, FIG. 4).

The foregoing has provided a list of various data parameters that may be received during STEP 62 and utilized to construct a virtual model of neighboring aircraft wake turbulence; however, it is emphasized that the foregoing list is non-exhaustive and that the wake turbulence data received during STEP 62 may include other information useful in predicting the wake turbulence created by the neighboring aircraft in addition to, or in lieu of, the data parameters listed above. For example, in an alternative group of embodiments, processor 22 may receive information identifying the neighboring aircraft's make and model during STEP 62. Processor 22 may then utilize a two-dimensional look-up table to recall a predetermined wake turbulence model associated with the neighboring aircraft's particular make and model. In certain embodiments, processor 22 may determine the neighboring aircraft's make and model utilizing the neighboring aircraft's alphanumeric registration number (commonly referred as to the "tail number" or, within the United States, the Federal Aviation Administration "N number") as related by ADS-B data provided by the neighboring aircraft or by TIS-B data provided by a control source and received via wireless transceiver 28.

If, during STEP 62, processor 22 determines that the air traffic data sources have not provided any data indicative of the neighboring aircraft's wake turbulence, processor 22 assigns a default wake turbulence model to the neighboring aircraft (STEP 66, FIG. 4). After modeling the neighboring aircraft's wake turbulence (STEP 64, FIG. 4) or assigning a default wake turbulence model to the neighboring aircraft (STEP 66, FIG. 4), processor 22 may adjust the neighboring aircraft's wake turbulence model in accordance with weather conditions (STEP 68, FIG. 4). More specifically, processor 22 may gather data from the air traffic data sources or from instrumentation onboard the host aircraft indicative of current weather conditions, such as wind speed and direction, and adjust the neighboring aircraft's wake turbulence accordingly; e.g., if a strong tail wind is present with respect to the neighboring aircraft, the aft travel of the neighboring aircraft's wake turbulence model may be decreased as a function of the magnitude of the tail wind. In addition, processor 22 may utilize data regarding the neighboring aircraft's position with respect to terrain and adjust the neighboring aircraft's wake turbulence accordingly; e.g., to take into account ground effects.

To complete algorithm 54, processor 22 generates a visual representation of the neighboring aircraft's wake turbulence model on monitor 24 (STEP 70, FIG. 4). Although the visual representation of the wake turbulence may be relatively realistic, it is generally preferred that the visual representation of the wake turbulence assumes the form of a relatively simple graphic to maintain display clarity. FIG. 3 illustrates an exemplary wake turbulence graphic 72, which assumes the form of a series of co-axial rings projecting aft of the neighboring aircraft. The co-axial rings increase in size and proximity to the ground as they move further from the aircraft's rear to emulate the typical flow pattern of air turbulence. In this particular example, wake turbulence graphic 72 generally represents the summation of all turbulent airflow (e.g., wingtip vortices, jet wash, prop wash, and the like) created by the neighboring aircraft. In alternative embodiments, the wake turbulence graphic may visually represent only the most significant component of the wake turbulence created by the neighboring aircraft, which will typically be the wingtip vortices. In still further embodiments, the wake turbulence graphic may visually represent only the wake turbulence created by the neighboring aircraft that is deemed potentially disruptive to the host aircraft. In embodiments wherein the wake turbulence graphic 72 comprises a series of co-axial rings, the intensity of the wake turbulence may be represented by the closeness of neighboring rings. Alternatively, a color coding scheme may be utilized to indicate the intensity of the wake turbulence; e.g., the portion of the wake turbulence corresponding to wake turbulence of the greatest intensity may be color coded red, the portion of the wake turbulence corresponding to wake turbulence of an intermediate intensity may be color coded yellow, and the portion of the wake turbulence corresponding to wake turbulence of a low intensity may be color coded green. After the performance of STEP 70, processor 22 completes algorithm 54 and advances to STEP 112 of main process 40 (FIG. 2) as described more fully below.

Figure 5:
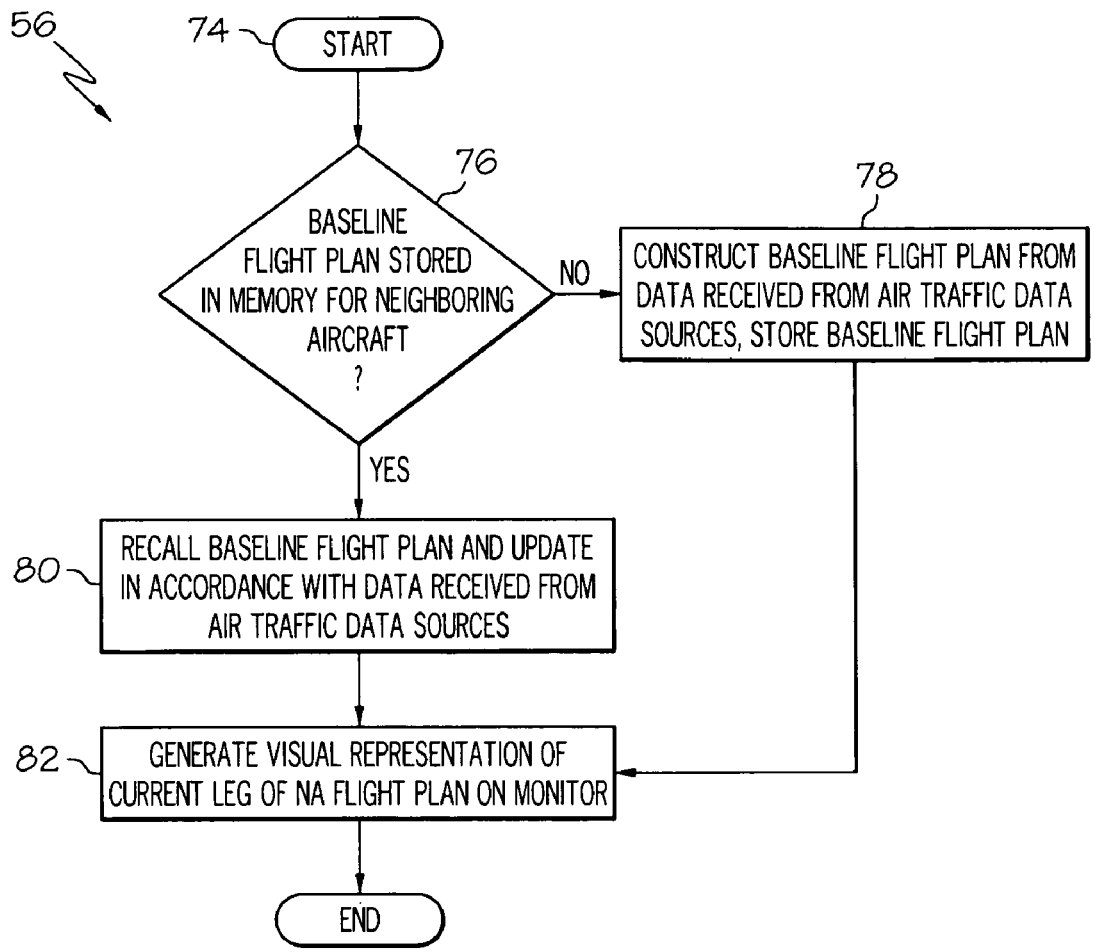

FIG. 5 illustrates an exemplary embodiment of neighboring aircraft flight plan algorithm 56 that may also be performed by process 22 during STEP 52 of main process 40 (FIG. 2). After commencing performance of algorithm 56 (STEP 74, FIG. 5), processor 22 determines if a baseline flight for the neighboring aircraft is available ((e.g., stored in a memory associated with processor 22 (STEP 76, FIG. 5)). If a baseline flight plan is not available (stored in memory), processor 22 constructs a baseline flight plan utilizing data provided from the air traffic data sources (STEP 78, FIG. 5); e.g., ADS-B data provided from the neighboring aircraft and/or TIS-B data provided by external control sources, such as ground stations. If a baseline flight plan for the neighboring aircraft is stored in memory, processor 22 checks for any updates to the neighboring aircraft's baseline flight plan as indicated by ADS-B data provided from the neighboring aircraft or by TIS-B data provided by a ground station or other external control source (STEP 80, FIG. 5). If available, processor 22 amends the neighboring aircraft baseline flight plan to accord with the received updates. In this manner, processor 22 may identify and visually notify the host aircraft's aircrew to recent alterations that have been implemented to the neighboring aircraft's baseline flight plan as a result of developing circumstances, such as weather conditions, traffic re-routing, flight crew request, onboard emergency, or control command issued from Air Traffic Control or the Federal Aviation Administration.

To complete algorithm 56 (FIG. 5), processor 22 generates a visual representation of at least a portion (e.g., the immediate leg) of the neighboring aircraft's current flight plan on monitor 24 (STEP 82, FIG. 5). With reference to FIG. 3, the visual representation of the immediate leg of the neighboring aircraft's flight plan may include a plurality of waypoint markers 84 connected by successive line segments 86. Although not shown in FIG. 3, a graphic representation of the neighboring aircraft's immediate projected flight path may also be generated during STEP 82 based upon state vector information contained within TIS-B or ADS-B data received via wireless transceiver 28 as previously described. The graphical depiction of the flight plan could also be in the form of a 3-dimensional representation on the display. After the performance of STEP 82, processor 22 completes algorithm 56 and advances to STEP 112 of main process 40 (FIG. 2) as described more fully below.

Figure 6:
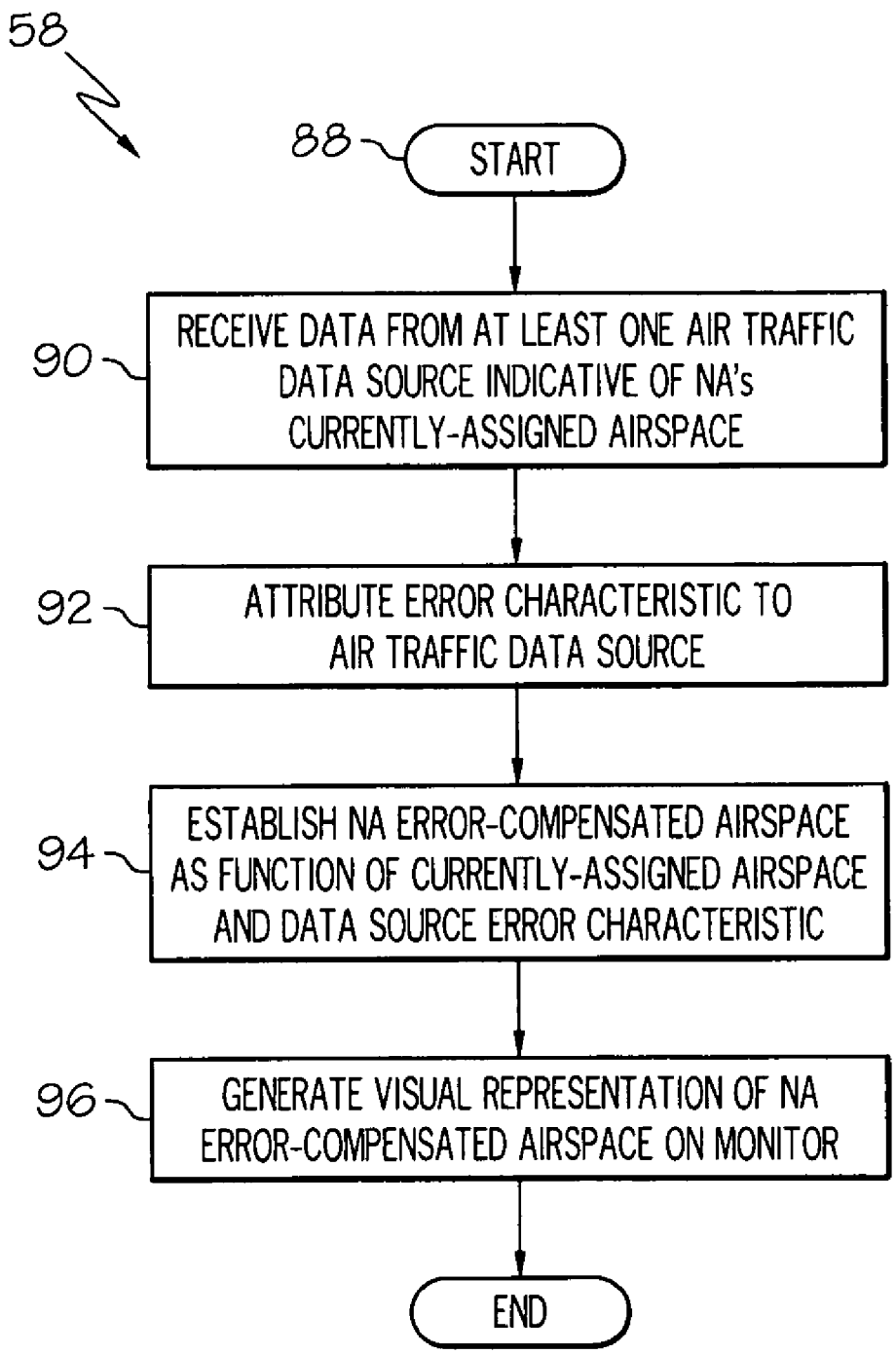

FIG. 6 is flowchart illustrating an exemplary embodiment of neighboring aircraft error-compensated airspace algorithm 58 that may be performed in addition to, or in lieu of, the other algorithms performed during STEP 52 of main process 40 (FIG. 2); i.e., algorithm 54 described above in conjunction with FIG. 4, and algorithm 56 described above in conjunction with FIG. 4. After commencing performance of algorithm 58 (STEP 88, FIG. 6), processor 22 receives data from at least one air traffic data source indicative of the airspace currently assigned to the neighboring aircraft (STEP 90, FIG. 6). If the neighboring aircraft is flying within an airspace specified by a flight plan, processor 22 may receive data indicative of the neighboring aircraft's flight plan during STEP 90 (FIG. 1) and identify the neighboring aircraft's currently assigned airspace by establishing the particular segment of the airway in which the neighboring aircraft is expected to reside at the current time. In instances wherein an airway is not accounted for by a flight plan (e.g., as may occur during navaid or direct routing), processor 22 may identify the assigned airspace based upon the neighboring aircraft's flight rules, traffic congestion, the accuracy of data provided by ground-based navigational devices (e.g., distance measuring equipment), and other such criteria.

Next, at STEP 92 (FIG. 6), processor 22 attributes an error characteristic to the data source utilized to determine the neighboring aircraft's detected position during STEP 44 of main process 40 (FIG. 2). Processor 22 may attribute an error characteristic to the relevant data source by recalling (e.g., from a memory included within processor 22) an error characteristic associated with the relevant position-determining data source. For example, if processor 22 utilizes data provided by onboard radar 32 to determine the host aircraft's detected position, processor 22 may utilize a two-dimensional lookup table to recall a pre-determined error characteristic associated with onboard radar 32 (e.g., ±100 vertical feet and ±50 horizontal feet). The error characteristic attributed to the air traffic data source during STEP 92 of algorithm 58 may be adjusted in relation to external criteria. For example, if the neighboring aircraft's current detected position was determined utilizing a global positioning system (GPS) unit deployed aboard the neighboring aircraft and subsequently broadcast to the host aircraft as ADS-B data, processor 22 may first attribute a pre-determined error characteristic to the GPS unit and then adjust the predetermined error characteristic in relation to the number of available satellites, the positioning of available satellites, weather conditions (e.g., humidity), and other such criteria. Alternatively, data indicative of an error characteristic may be included within the information wirelessly provided to processor 22 by an external control source or a neighboring aircraft.

Figure 7:
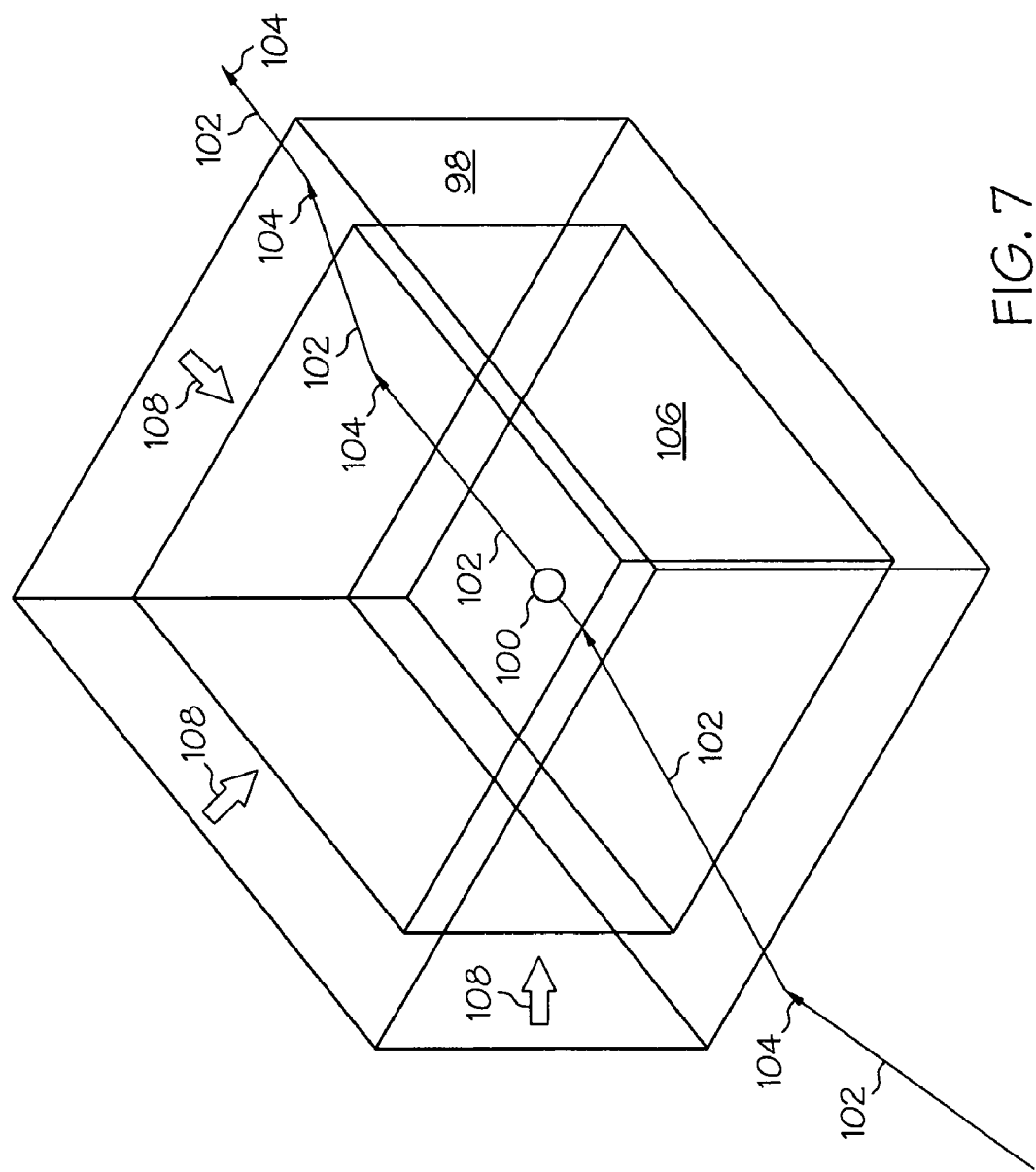
FIG. 7 conceptually illustrates the manner in which a neighboring aircraft's error-compensated airspace may be determined as a function of the neighboring aircraft's currently-assigned airspace and an error characteristics attributed to the data source utilized to determine the neighboring aircraft's detected position.

After attributing an error characteristic to the air traffic data source utilized to estimate the neighboring aircraft's current position (STEP 92, FIG. 6), processor 22 establishes an error-compensated airspace as a function of the currently-assigned airspace and the error characteristic attributed to the data source (STEP 94, FIG. 6). FIG. 7 conceptually illustrates one manner in which processor 22 may establish the error-compensated airspace during STEP 96. In the context of FIG. 7, larger wireframe box 98 represents the outer boundaries of the aircraft's currently-assigned airspace, smaller wireframe box 106 represents the outer boundaries of the error-compensated airspace, disc-shaped marker 100 represents the aircraft's expected nominal position, and line segments 102 and waypoint markers 104 collectively represent a leg of the aircraft's planned flight path. As can be seen in FIG. 7, the expected nominal position (disc-shaped marker 100) resides at a given location along neighboring aircraft's planned flight path (line segments 102) and is encompassed by the error-compensated airspace (smaller wireframe box 106). The error-compensated airspace (smaller wireframe box 106) is, in turn, encompassed by the currently-assigned airspace (larger wireframe box 98). In this particular example, the aircraft's assigned airspace and the error-compensated airspace each have a boxed (i.e., a regular hexahedron) geometry. This example notwithstanding, the currently-assigned airspace (larger wireframe box 98) and the error-compensated airspace (smaller wireframe box 106) may assume other polygonal shapes, as well as spherical and conical shapes, in other contexts. Furthermore, the error-compensated airspace may not always assume the same form as does the currently-assigned airspace.

As previously stated, and as indicated in FIG. 7 by arrows 108, the neighboring aircraft's error-compensated airspace (smaller wireframe box 106) is derived as a function of the currently assigned airspace (larger wireframe box 98) taken in conjunction with the error characteristic attributed to data source or sources utilized to estimate the neighboring aircraft's current position. To continue the simplified example introduced above, if the position of the host aircraft is detected utilizing onboard radar 32, and processor 22 attributes an error characteristic to onboard radar 32 of ±100 vertical feet and ±50 horizontal feet, then processor 22 may establish the outer boundaries of the error-compensated airspace in the following manner. If the total vertical clearance of the assigned airspace is 1,000 feet, processor 22 will determine the upper boundary of the assigned airspace to be 500 feet above the aircraft's expected nominal position, as taken along a first axis. Processor 22 will further determine the upper boundary of the error-compensated airspace to be 100 feet below this position or, stated differently, 400 feet above the expected nominal position of the host aircraft, as taken along the first axis. Similarly, processor 22 may determine the lower boundary of the error-compensated airspace to be 100 feet above the lower boundary of the assigned airspace or 400 feet below the expected nominal position of the host aircraft, as taken along the first axis. Furthermore, if the forward-aft length of the assigned airspace is 10,000 feet, processor 22 may determine the forward and aft boundaries of the error-compensated airspace to each be 4,450 feet from the expected nominal position of the host aircraft, as taken along a second axis perpendicular to the first axis. Finally, if the left-right width of the assigned airspace is 5,000 feet, processor 22 may determine the left and right boundaries of the error-compensated airspace to each be 2,450 feet from the aircraft's expected nominal position, as taken along a third axis orthogonal to the first and second axes.

To complete algorithm 58 (FIG. 6), processor 22 generates a visual representation of the neighboring aircraft's error-compensated airspace on monitor 24 (STEP 96, FIG. 6). For example, and as indicated in FIG. 3, the outer boundaries of neighboring aircraft's error-compensated airspace may be visually indicated by three dimensional wireframe box 110. Furthermore, at least a portion of the spatial volume contained within wireframe box 110 may be shaded or semi-opaque; e.g., the entire volume of the error-compensated airspace may be shaded or semi-opaque. Of course, other symbology may also be employed; e.g., in alternative embodiments, only the outer surfaces of the error-compensated airspace may be shaded or semi-opaque.

After performing one or more of algorithms 54, 56, and 58 during STEP 52 of main process 40 (FIG. 2), processor 22 advances to STEP 112. During STEP 112, processor 22 produces on monitor 24 (FIG. 1) additional graphics included in the graphical display. The graphics produced on monitor 24 during STEP 112 will inevitably vary amongst different embodiments. In the exemplary case of three dimensional perspective display 50 (FIG. 3), processor 22 may generate on monitor 24 various navigational symbols including a flight path symbol 115, which indicates the track of the host aircraft (i.e., the direction in which the aircraft is actually traveling), and an attitude symbol 117 (e.g., two horizontal marks representing the aircraft wings), which indicates the host aircraft's attitude with respect to the heading angle. Furthermore, processor 22 may generate on monitor 24 three dimensional rendered or "synthetic" terrain, such as mountain range graphic 119 and horizon graphic 121.

Next, at STEP 114 (FIG. 2), processor 22 establishes the host aircraft's time-projected flight path utilizing data provided from navigation system 30. Processor 22 may determine the host aircraft's time-projected flight path as a function of the host aircraft's current flight parameters (e.g., heading and speed), the host aircraft's flight plan, and wind conditions. Processor 22 then advances to STEP 116 of process 40 wherein processor 22 determines if the host aircraft's time-projected flight path transects one or more of the neighboring aircraft flight characteristics established during STEP 52 via the performance of algorithms 54, 56, and/or 58. If the host aircraft's time-projected flight path does not transect any of the neighboring aircraft flight characteristics generated during STEP 52, processor 22 advances to STEP 118 described below. If, instead, the host aircraft's time-projected flight path transects one or more of the neighboring aircraft's flight characteristics, processor 22 generates a first alert (STEP 120, FIG. 2). The first alert may be visual, audible, and/or haptic and preferably indicates which of the neighboring aircraft flight characteristics the host aircraft's projected flight path transects. For example, the first alert may include an alteration in the appearance of visual representation of the particular flight characteristic of transected by the host aircraft's projected flight path; e.g., if the host aircraft's time-projected flight path transects the wake turbulence created by the neighboring aircraft, processor may cause wake turbulence graphic 72 to flash or change to a first warming color (e.g., red). Alternatively, the first alert may be text message such as "WAKE TURBULENCE WARNING," displayed on monitor 24 (FIG. 1). After generating the first alert (STEP 120, FIG. 2), processor 22 returns to STEP 44 and main process 40 is repeated.

If, during STEP 120, processor 22 determines that the host aircrafts' time-projected flight path does not transect any of the neighboring aircraft's flight characteristics, processor 22 next determines whether the host aircraft's time-projected flight path comes within a predetermined distance of any of the neighboring aircraft's flight characteristics (STEP 118, FIG. 2). If the host aircraft's time-projected flight path does not come within the predetermined distance of any of the neighboring aircraft's flight characteristics, processor 22 advances to STEP 44 and repeats performance of main process 42. However, if the host aircraft's time-projected flight path comes within the predetermined distance of the neighboring aircraft's flight characteristics, processor 22 generates a second alert indicating which of the neighboring aircraft flight characteristics has been identified as posing a low priority threat (STEP 122, FIG. 2). Like the first alert, the second alert may be visual, audible, and/or haptic. However, the second alert need not convey the same level of urgency as does the first alert. In a preferred embodiment, the second alert includes alteration in the appearance of the graphic representing the appropriate neighboring aircraft flight characteristic; if the host aircraft's projected flight path transects the wake turbulence created by the neighboring aircraft, processor may cause wake turbulence graphic 72 to change to a second warming color (e.g., yellow). Processor 22 then returns to STEP 44, and the process is repeated. Notably, in alternative embodiments, warning alerts may also be generated based upon the proximity of the host aircraft's time-projected error-compensated airspace relative to the neighboring aircraft flight characteristic or characteristics; as one example, if the host aircraft's time-projected error-compensated airspace overlaps with the neighboring aircraft's error-compensated airspace, a high priority alert may be generated.

Figure 8:
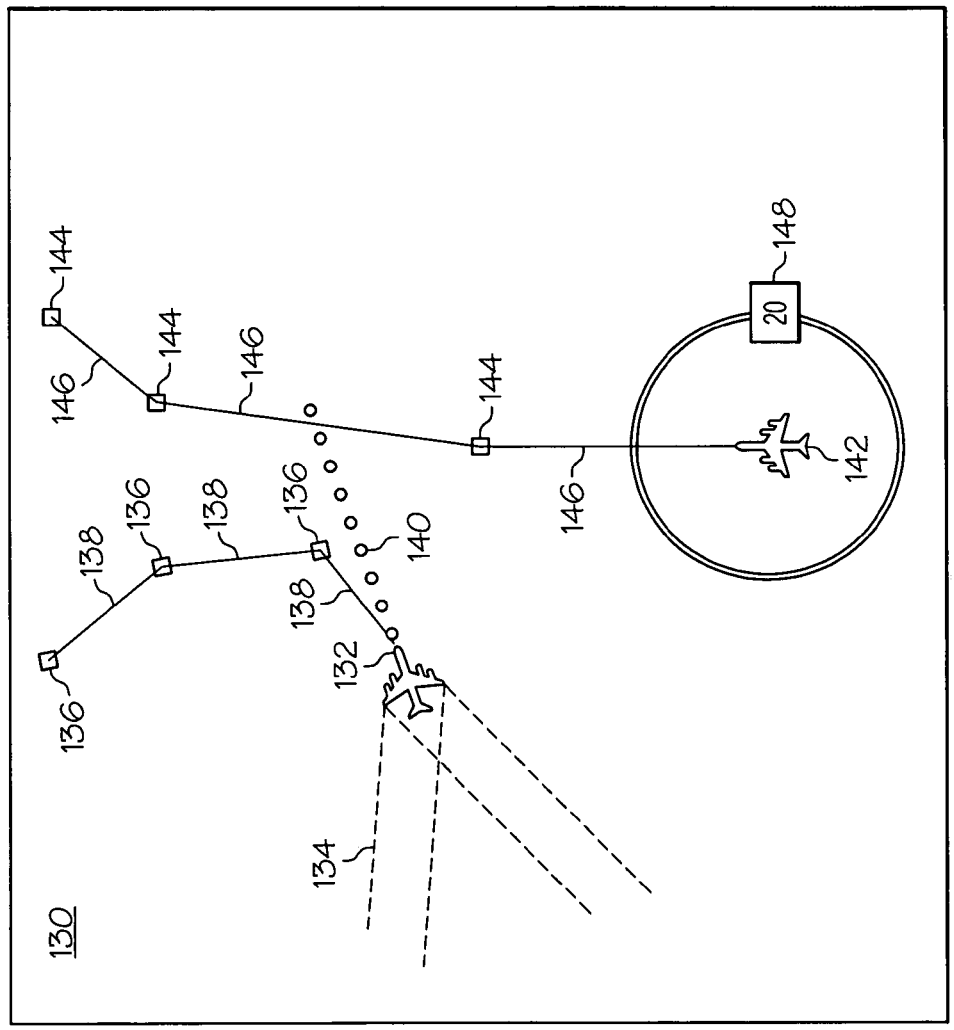
FIG. 8 is a snapshot of a two dimensional moving map display that may be generated on the monitor included in the avionics display system shown in FIG. 1 via the performance of the exemplary process illustrated in FIG. 2.

The foregoing exemplary embodiment was discussed above in conjunction with a three dimensional display generated as a perspective view originating from the host aircraft's cockpit; however, embodiments of the foregoing method may also be utilized to generate a three dimensional isometric display originating from various other vantage points (e.g., from conceptual chase plane located outside of the host aircraft's error-compensated airspace) or a two dimensional display, such as moving map display. Further emphasizing this point, FIG. 8 illustrates an exemplary two dimensional moving map display 132 that may be generated on monitor 24 (FIG. 1) pursuant the performance to main process 40 (FIG. 2). As can be seen in FIG. 8, moving map display 130 includes: (i) a neighboring aircraft graphic 132 representing the current detected position of a neighboring aircraft and generated during STEP 48 of main process 40, (ii) a wake turbulence graphic 134 visually representing the wake turbulence created by the neighboring aircraft (more specifically, two sets of dashed lines representing the wingtip vortices) and generated during STEP 52 of main process 40 via the performance of neighboring aircraft wake turbulence algorithm 54, (iii) a visual representation of the current leg of the neighboring aircraft's flight plan as indicated by waypoint markers 136 and line segments 138 and generated during STEP 52 of main process 40 via the performance of neighboring aircraft flight plan algorithm 56, and (iv) a projected flight path graphic 140 indicating the neighboring aircraft's immediate projected flight path and also generated during STEP 52 of main process 40. Moving map display 130 also includes the following graphics, each of which may be produced on monitor 24 during STEP 112 of main process 40: (i)

a host aircraft graphic 142 indicating the current detected position of the host aircraft, (ii) a visual representation of the current leg of the host aircraft's flight plan as indicated by waypoint markers 144 and line segments 146, and (iii) a range ring graphic 148 visually indicating the general scale of moving map display 130.

In view of the foregoing, there has been provided an exemplary embodiment of an avionics display system and method for visually expressing flight characteristics pertaining to neighboring aircraft in an intuitive and readily comprehendible manner. In the above-described exemplary embodiments, the neighboring flight characteristics included the wake turbulence created by a neighboring aircraft, the neighboring aircraft's current flight path, and the neighboring aircraft's error-compensated airspace; i.e., the airspace in which the neighboring aircraft's detected position should reside to ensure that the neighboring aircraft's actual position remains within the neighboring aircraft's currently-assigned airspace. While the foregoing exemplary embodiment was described above in the context of a fully functioning computer system (i.e., avionics display system 20 shown in FIG. 1), those skilled in the art will recognize that the mechanisms of the present invention are capable of being distributed as a program product (i.e., an avionics display program) and, furthermore, that the teachings of the present invention apply to the program product regardless of the particular type of computer-readable media (e.g., floppy disc, hard drive, memory card, optical disc, etc.) employed to carry-out its distribution. Furthermore, although described above in the context of an aircraft, embodiments of the method and system are equally applicable to spacecraft. Furthermore, although described above in the context of an in-flight aircraft, embodiments of the method and system are equally applicable to all phases of flight including takeoff, climb-out, final approach, and landing.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A process to be carried out by an avionics display system deployed on a host aircraft and including a monitor, the process comprising:
   receiving air traffic data indicative of a neighboring aircraft's current detected position from a first air traffic data source;
   attributing an error characteristic to the first air traffic data source based, at least in part, on the type of instrumentation utilized by the first air traffic data source to detect the neighboring aircraft's current position;
   identifying an airspace assigned to the neighboring aircraft at a given time;
   reducing the volume of the assigned airspace as a function of the error characteristic attributed to the first air traffic data source to yield an error-compensated airspace for the neighboring aircraft; and
   generating on the monitor a visual representation of the outer boundaries of the neighboring aircraft's error-compensated airspace.

2. A process according to claim 1 wherein the step of generating comprises producing on the monitor a three dimensional wireframe indicating the outer boundaries of the neighboring aircraft's error-compensated airspace.

3. A process according to claim 1 further comprising:
   establishing the host aircraft's time-projected flight path; and
   generating a first alert if the host aircraft's time-projected flight path intersects the neighboring aircraft's error-compensated airspace.

4. A process according to claim 3 wherein the step of generating the first alert comprises altering the appearing the visual representation of the neighboring aircraft's error-compensated airspace.

5. A process according to claim 3 further comprising the step of generating a second alert if the host aircraft's time-projected flight path comes within a predetermined distance of the first neighboring aircraft's error-compensated airspace.

6. An avionics display system for deployment onboard an aircraft including an air traffic data source, the air traffic data source providing the avionics display system with data indicative of at least one flight characteristic pertaining to a neighboring aircraft, the avionics display system comprising:
   a monitor; and
   a processor operatively coupled to the monitor, the processor configured to: (i) receive air traffic data from the air traffic data source indicative of the current detected position of a neighboring aircraft; (ii) attribute an error characteristic to the air traffic data source; (iii) identify an airspace assigned to the neighboring aircraft at a given time, (iv) establish an error-compensated airspace for the neighboring aircraft by reducing the volume of the assigned airspace as a function of the magnitude of the error characteristic attributed to the air traffic data source, and (v) generate on the monitor;
   a three dimensional wireframe indicating the outer boundaries of the neighboring aircraft's error-compensated airspace.

7. A process according to claim 1 wherein the step of receiving comprises receiving from the neighboring aircraft Automatic Dependent Surveillance-Broadcast (ADS-B) data indicative of the current position of the neighboring aircraft, as estimated by instrumentation deployed onboard the neighboring aircraft.

8. A process according to claim 7 wherein the step of attributing comprises attributing an error characteristic to the first air traffic data source based, at least in part, upon the type of instrumentation deployed onboard the neighboring aircraft and utilized to detect the neighboring aircraft position.

9. A process according to claim 7 wherein the step of attributing comprises receiving data indicative of an error characteristic associated with the first air traffic data source as part of the ADS-B data provided by the neighboring aircraft.

10. An avionics display system according to claim 6 wherein the processor is further configured to: (i) receive Automatic Dependent Surveillance-Broadcast (ADS-B) data from a neighboring aircraft indicative of the current position of the neighboring aircraft, as estimated by instrumentation deployed onboard the neighboring aircraft; and
   (ii) attributing an error characteristic to the first air traffic data source based upon information contained within the ADS-B data.

* * * * *